A. WILZIN.
MANUFACTURE OF FLAT WARE BLANKS.
APPLICATION FILED JAN. 26, 1912.
1,091,415.
Patented Mar. 24, 1914.
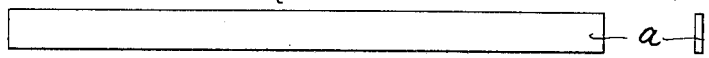
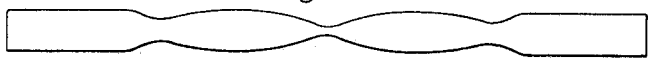
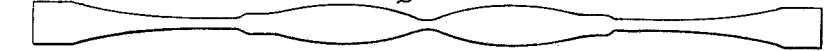
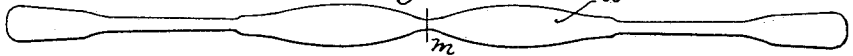
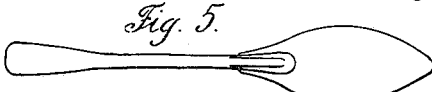
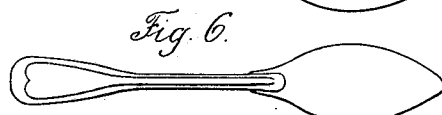
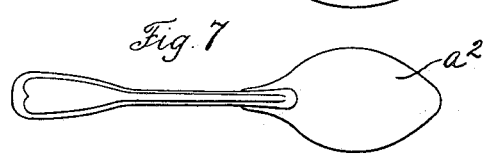
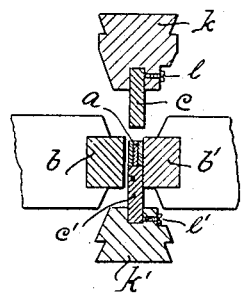
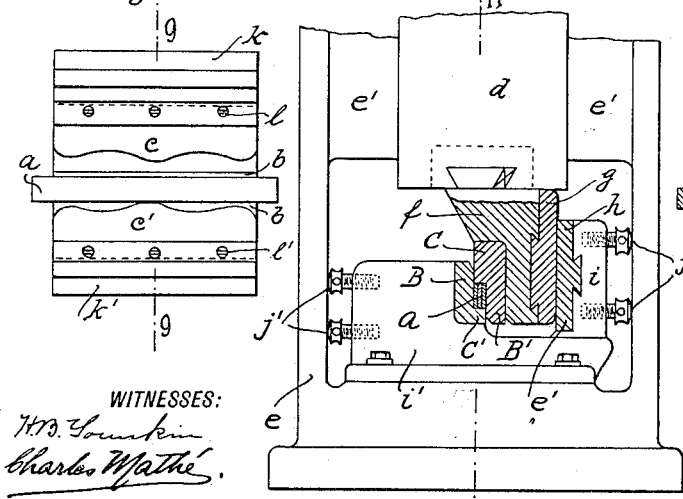
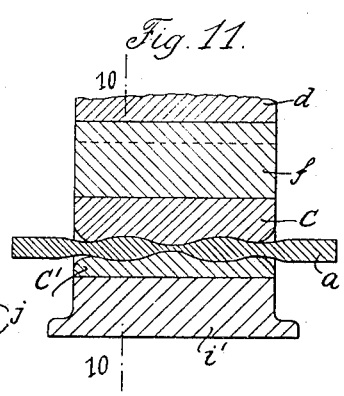
WITNESSES:
INVENTOR
Arthur Wilzin
BY
John Locka
ATTORNEY

UNITED STATES PATENT OFFICE.

ARTHUR WILZIN, OF ST.-OUEN, FRANCE.

MANUFACTURE OF FLAT-WARE BLANKS.

1,091,415.  Specification of Letters Patent.  Patented Mar. 24, 1914.

Application filed January 26, 1912. Serial No. 673,589.

*To all whom it may concern:*

Be it known that I, ARTHUR WILZIN, a citizen of the United States, and resident of St.-Ouen, in the Department of Seine, France, have invented certain new and useful Improvements in the Manufacture of Flat-Ware Blanks, of which the following is a specification.

My present invention has for its object to provide an improved method for the rapid, economical and practical manufacture of flatware blanks, such as for instance blanks for forks or spoons.

As carried out by me in practice, my process is conducted without leaving any waste in the production of the blanks.

A characteristic feature of my present invention is the simultaneous production or shaping of a plurality of blanks, by pressure applied to their edges while the flat sides of the blanks are braced by suitable lateral holding members. The advantages secured by this treatment, and other features of my invention, will be fully set forth in the description following hereinafter.

Reference is to be had to the accompanying drawings in which—

Figures 1 and 1ª are a side elevation and an end view respectively of a preliminary piece from which, in this particular instance, two flatware blanks are formed; Figs. 2, 3 and 4 illustrate three successive stages in the formation of a double spoon blank from said preliminary piece; Figs. 5, 6 and 7 illustrate three successive stages in the further treatment of one of the intermediate blanks shown in Fig. 4; Fig. 8 is a side elevation of one form of apparatus suitable for converting the preliminary piece shown in Figs. 1 and 2, into the intermediate blank shown in Fig. 4, one of the lateral holding members being omitted from Fig. 8; Fig. 9 is a cross section on line 9—9 of Fig. 8; Fig. 10 is a partial elevation of another form of apparatus for the same purpose, partly in section on line 10—10 of Fig. 11; and Fig. 11 is a cross section on line 11—11 of Fig. 10.

In the specific instance of carrying out my invention which is illustrated by Figs. 1 to 4, I first form in any suitable manner, as by cutting from a bar or stamping from a sheet, a strip-like preliminary piece of metal $a$, that is to say a piece of rectangular outline and of uniform thickness. The preliminary piece $a$ shown in Figs. 1 and 1ª is of a weight practically equal to a multiple (double) of the weight of the blank to be produced. This preliminary piece, preferably beginning with its central portion, is modified in outline, or shaped, by means of edgewise pressure, while exerting a holding force against its flat sides, so that the thickness of the portion subjected to the contour-shaping dies or tools may remain unaltered. This operation may be performed in successive stages, say three stages, to give the piece the successive forms shown in Figs. 2, 3 and 4, or by the employment of particularly powerful and suitable mechanism, the piece $a$ may be converted in one operation into the intermediate blank shown in Fig. 4.

In Figs. 8 to 11, I have illustrated two forms of apparatus suitable for carrying out my invention, the particular edge-pressing dies shown being adapted to convert the preliminary piece $a$ of Figs. 1 and 1ª, into the shape shown in Fig. 2. It will be understood that by substituting dies of a different shape, either one of these apparatus may be used for the second and for the third stage represented by Figs. 3 and 4 respectively, or even for carrying out the entire edge-shaping operation in one step, as suggested above. Similarly, according to the particular dies employed, I will obtain either intermediate blanks of the shape shown in Fig. 4, suitable for the manufacture of spoons, or blanks such as required for the making of forks or other articles.

In Figs. 8 and 9, $b$ and $b'$ are the lateral holding members which are rigid and unyielding during the operation, each of them being adapted to engage one of the flat sides of the material under treatment, so as to prevent any thickening of the material. For the purpose of facilitating the insertion and removal of the material, the two holding members may be separable, as by having the member $b$ movable laterally (see Fig. 9), but it will be understood that in the operative position the member $b$ will engage the material $a$ in the same manner as shown for the member $b'$, and will be held firmly and unyieldingly in this position, by any suitable means. The apparatus further comprises the edge-pressing dies or jaws $c$, $c'$ secured removably, as by screws $l$, $l'$, to holders $k$, $k'$ movable toward and from each other by means of plungers or other suitable mechanism (not shown). Of course, one of the holders may be stationary.

In the construction illustrated by Figs. 10 and 11, each of the lateral holding members is made integral with one of the edge-pressing dies. The resulting combined holding and pressing jaw is L-shaped, the die C being integral with the holding member B', and the die C' integral with the holding member B. The jaw B, C' is set removably in a suitable recess of the slide $i'$ adjustable toward the other jaw B', C by means of screws $j'$ bearing against a suitable surface of the frame $e$. In a similar way, the jaw B', C is set removably in a recess of the holder $f$ rigidly secured, in any suitable manner, to the plunger $d$ movable between the guides $e'$. On the outer surface of the holder $f$ is secured a smooth tempered steel plate $g$, in engagement with a like plate $h$ secured to the slide $i$ movable laterally on the slide $i'$. Screws $j$ let into the slide $i$ and bearing against a suitable portion of the frame $e$ serve to press the plate $h$ toward the plate $g$ so as to form a firm backing for the lateral holding member B' while a downward pressure is being exerted by the edge-pressing die C. It will be understood that by turning the screws $j'$ in the proper direction, the pressure holding the jaw B, C' against outward movement may be suitably adjusted to prevent the thickening of the material under treatment. Fig. 10 shows clearly that in the operative position, the right-hand or inner surfaces of the stationary jaw members B, C' form guides for the corresponding left-hand or inner surfaces of the movable jaw member B', C.

When applying edgewise contour-shaping pressure simultaneously to a plurality of blank-forming sections, as exemplified by Figs. 2, 3 and 4, I secure the advantage of a more uniform flow of the material in the tandem-wise arranged blanks, particularly at the portion at which the blanks are temporarily connected. Thus in Figs. 2, 3, 4 and 11 those portions of the preliminary piece and of the blank which subsequently form the bowls of the spoons, receive a pressure which forces or crowds the material lengthwise in both directions, the material in one section of the piece and blank being forced, to a certain extent, against an opposing longitudinal force exerted in the other section of the blank. A mutual supporting or bracing action thus results, with a closer conformation of the material to the shape of the dies.

It is preferable to use a strip or preliminary piece $a$ somewhat narrower than the widest part of the shaped blank $a'$ (Fig. 4). This is illustrated best in Fig. 11, where it can be seen that the projecting ends (which retain their original width) are narrower than the widened portions between the dies C, C'. I find that this feature is beneficial, as the metal in the parts of greatest width will more easily rise or expand beyond the original width than flow lengthwise. The pressure required to fill the shape is therefore less.

Figs. 9 and 10 also illustrate another feature of my invention, viz.: the placing of a plurality of preliminary pieces $a$ side by side, with their flat surfaces in mutual contact, between the holding members $b$, $b'$ or B, B' respectively, so that the edge-pressing or contour-shaping operation will be exerted simultaneously on a plurality of preliminary pieces $a$ lying side by side. This mode of carrying out my invention is of particular importance when the preliminary pieces $a$ are comparatively thin. In this event, the pressing of a single piece $a$ at a time would require very thin punches $c$, $c'$ or C, C', the frictional resistance against the side pressure organs becomes excessive in proportion to mass in the blank and thus impedes the flow of the molecules and consequently the fragile punches can no longer be relied on to do the work under fair conditions of durability. On the other hand, when several of these preliminary pieces, even thin ones, are placed side by side, the side pressure friction becomes proportionately less, the molecules flow more freely and the strain on the punches is considerably reduced, all the more so because these punches are proportionately thicker. When the preliminary pieces are of sufficient thickness, they may be subjected to edge pressure singly.

The operation described above produces two connected intermediate blanks $a'$ of the shape shown in Fig. 4. These are separated from each other by a transverse cut made at $m$, and the intermediate blanks are then subjected to lateral crushing or rolling, in the well-known manner, to produce successively the shapes shown in Figs. 5, 6 and 7, or with an apparatus of sufficient power, the intermediate blank $a'$ of Fig. 4 may be converted by one operation into the blank $a^2$ of Fig. 7. This blank is ready for the final design stamping or bowl-shaping, to be performed in any usual or approved manner. In some cases, if the apparatus be powerful enough and the metal of proper character, the design stamping may be performed simultaneously with the steps illustrated by Figs. 5, 6 and 7.

While I have referred to the possibility of moving the holding member $b$ or B' laterally, as a rule this is not absolutely necessary, since the insertion and removal of the material under treatment may be effected without this at the time the two punches ($c$ and $c'$ or C and C') are separated vertically with the upper punch in the raised position.

It will be obvious that instead of first dividing the double blanks of Fig. 4 and then performing the operations of Figs. 5, 6 and 7 on the single blanks, I might perform these operations on the double blanks and then separate the connected blanks at the points of the bowls; or the separation may occur at any suitable intermediate point of the process.

In applying my invention to the manufacture of other flatware than shown, for instance forks, the operations will be substantially the same as above described, the dies being given a different shape, of course, as will be obvious to any person skilled in the art. When making forks, it is desirable that the wide portions from which the tines are formed subsequently, should be at the connected ends of the tandem blanks, that is to say, such tine portions should be placed in the same relative position as the bowl portions of the spoon blanks in Figs. 2, 3 and 4. This, as described, secures a more uniform action of the opposing edge-pressing dies, and facilitates the molecular movement of the metal.

When proceeding as described herein, there is evidently no waste of material, or practically none, the preliminary pieces $a$ being produced without waste from a strip or sheet of metal, and the subsequent edge-pressing and crushing operations involving practically no loss of material. The intermediate blank $a'$ (Fig. 4) produced according to my process is of substantially uniform thickness all over and nearly equal in length to the finished graded blank $a^2$ (Fig. 7), but narrower and thicker.

In carrying out my present invention, it is preferred that the transverse sectional areas of the profiled or shaped intermediate blanks $a'$ should be substantially equal to the cross sectional areas which are exhibited at corresponding points by the blank $a^2$ (Fig. 7) ready for the final design-stamping or rolling.

The lateral holding members $b, b'$ or B, B' must be quite rigid or unyielding in the operative position, since otherwise (in view of the extraordinarily high pressures or reactions arising within the material) detrimental protuberances and burs may be formed, as well as irregularities in the thickness and in the elongation of the material, seriously interfering with, if not preventing altogether, an operation free from uncertainty and waste.

Various modifications may be made without departing from the nature of my invention as set forth in the appended claim. If desired, annealing operations may intervene between some of the steps herein described.

As explained above, the dies shown in Figs. 8 to 11 are adapted to give the preliminary piece $a$ of Figs. 1 and 1ª the shape shown in Fig. 2, that is to say this initial operation shapes only the central portion of the multiple or tandem blank and transforms said portions into the contiguous ends (bowl portions) of the desired intermediate blanks $a'$. The next operation, illustrated by Fig. 3, consists in a similar contour-shaping operation which however is applied only to the adjoining intermediate portions or shanks of the individual blanks, that is to say during the second stage the end portions of the preliminary piece and the previously shaped contiguous bowl portions are not subjected to edgewise pressure. Finally, a third contour-shaping operation by means of edgewise pressure is applied exclusively to the free ends of the preliminary piece which are adapted to form the handles of the spoons or other articles, this last step is illustrated by Fig. 4. While I have referred above to the possibility of merging these three steps into one, I prefer the specific step-wise operation just described, as it can be carried out with less powerful apparatus.

I claim:

The herein described improvement in the manufacture of flatware blanks, which consists in assembling a plurality of flat blanks side by side, each blank being of suitable width, thickness, and of a weight to produce the desired fork or spoon blank, confining the assembled blanks in a die side by side in such manner as to prevent lateral expansion of the assembled blanks, and then subjecting the assembled blanks thus confined to edgewise pressure from a die of a form to simultaneously displace the metal of each of the assembled flat blanks longitudinally and transversely, thus imparting thereto the desired edge contour.

In testimony whereof I have signed this specification in the presence of two subscribing witnesses.

ARTHUR WILZIN.

Witnesses:
H. C. COXE,
JNO. BAKER.